United States Patent
Auffinger et al.

(10) Patent No.: US 10,989,244 B2
(45) Date of Patent: Apr. 27, 2021

(54) EME PROTECTION CAP SYSTEM WITH PUSH SEALANT EXTRUSION MECHANISM

(71) Applicant: THE BOEING COMPANY, Chicago, IL (US)

(72) Inventors: Sean Auffinger, Ladson, SC (US); Bart Stevens, Summerville, SC (US)

(73) Assignee: THE BOEING COMPANY, Chicago, IL (US)

( * ) Notice: Subject to any disclaimer, the term of this patent is extended or adjusted under 35 U.S.C. 154(b) by 215 days.

(21) Appl. No.: 16/196,089

(22) Filed: Nov. 20, 2018

(65) Prior Publication Data

US 2020/0158158 A1   May 21, 2020

(51) Int. Cl.
| | |
|---|---|
| F16B 37/14 | (2006.01) |
| B64D 45/02 | (2006.01) |
| F16B 33/00 | (2006.01) |
| F16B 11/00 | (2006.01) |

(52) U.S. Cl.
CPC .............. *F16B 37/14* (2013.01); *B64D 45/02* (2013.01); *F16B 33/004* (2013.01); *F16B 11/006* (2013.01)

(58) Field of Classification Search
CPC ...... F16B 37/14; F16B 37/145; F16B 33/004; F16B 11/006; F16B 39/225; F16B 39/021; B64D 45/02; B64D 37/32
USPC .......................................... 411/82, 377, 80.1
See application file for complete search history.

(56) References Cited

U.S. PATENT DOCUMENTS

| | | |
|---|---|---|
| 1,368,637 A | 2/1921 | McFarland |
| 1,868,084 A | 7/1932 | Wheelwright |
| 3,699,368 A | 10/1972 | Palmer |
| 4,013,190 A | 3/1977 | Wiggins et al. |
| 4,519,974 A | 5/1985 | Bravenec et al. |
| 4,630,168 A | 12/1986 | Hunt |

(Continued)

FOREIGN PATENT DOCUMENTS

| | | |
|---|---|---|
| CA | 2856687 A1 | 3/2015 |
| CA | 2858461 A1 | 3/2015 |

(Continued)

OTHER PUBLICATIONS

Bart Stevens et al., U.S. Appl. No. 15/718,618, filed Sep. 28, 2017.

(Continued)

*Primary Examiner* — Victor D Batson
*Assistant Examiner* — Amit Singh Dhillon
(74) *Attorney, Agent, or Firm* — Marshall, Gerstein & Borun LLP

(57) ABSTRACT

A cap assembly for enclosing a metallic fastener which extends through a structure. The assembly includes a housing having an inner wall and an outer wall which extends about and is spaced apart from the inner wall defining a space positioned between the inner wall and outer wall. The assembly further includes a plunger member with a side wall portion secured to an end wall portion. The side wall portion of the plunger member has a thickness dimension smaller than a distance between the inner wall and the outer wall to position the sidewall portion of the plunger member within the space. With the side wall portion positioned within the space, the end wall portion is positioned in alignment with the inner wall and with an opening defined by and through the inner wall.

20 Claims, 9 Drawing Sheets

(56) References Cited

U.S. PATENT DOCUMENTS

| | | | |
|---|---|---|---|
| 4,636,446 | A | 1/1987 | Lee |
| 4,826,380 | A | 5/1989 | Henry |
| 4,850,778 | A | 7/1989 | Clough et al. |
| 4,884,933 | A | 12/1989 | Preusker et al. |
| 5,108,853 | A | 4/1992 | Feres |
| 5,752,794 | A | 5/1998 | Krawczak |
| 6,035,595 | A * | 3/2000 | Anderson ............. E04F 13/045 411/258 |
| 6,053,683 | A | 4/2000 | Cabiran |
| 6,102,128 | A | 8/2000 | Bridgeman |
| 6,318,942 | B1 | 11/2001 | Wieczorek |
| 7,134,666 | B2 | 11/2006 | Beyssac et al. |
| 7,755,876 | B2 | 7/2010 | Morrill et al. |
| 7,918,081 | B2 | 4/2011 | Schlichting et al. |
| 7,936,550 | B2 | 5/2011 | Morrill et al. |
| 8,318,942 | B2 | 11/2012 | Zhang |
| 8,388,293 | B2 | 3/2013 | Hutter, III |
| 8,711,541 | B2 | 4/2014 | Umemoto et al. |
| 8,717,735 | B2 | 5/2014 | Day et al. |
| 8,717,736 | B2 | 5/2014 | Asahara et al. |
| 8,840,740 | B2 | 9/2014 | Rorabaugh et al. |
| 8,894,338 | B2 | 11/2014 | Dobbin et al. |
| 9,133,874 | B2 | 9/2015 | Hill |
| 9,188,226 | B2 | 11/2015 | Pajel et al. |
| 9,228,604 | B2 | 1/2016 | Dobbin |
| 10,151,337 | B2 | 12/2018 | Hill |
| 2002/0192052 | A1 | 12/2002 | Ruspa |
| 2008/0137259 | A1 | 6/2008 | Heeter et al. |
| 2009/0194297 | A1 | 8/2009 | Ortiz Teruel |
| 2010/0303582 | A1 | 12/2010 | Choi et al. |
| 2012/0217673 | A1 * | 8/2012 | Hutter, III .......... B29D 99/0085 264/219 |
| 2013/0206759 | A1 | 8/2013 | Wurz et al. |
| 2014/0048198 | A1 | 2/2014 | Dobbin et al. |
| 2014/0261956 | A1 * | 9/2014 | Wiseman ................ A47L 13/08 156/60 |
| 2014/0341675 | A1 | 11/2014 | Dobbin |
| 2015/0060465 | A1 | 3/2015 | Limbacher et al. |
| 2015/0082603 | A1 | 3/2015 | Rawdon et al. |
| 2015/0086295 | A1 | 3/2015 | Cameron et al. |
| 2015/0184688 | A1 | 7/2015 | Dobbin et al. |
| 2015/0345533 | A1 | 12/2015 | Hill |
| 2015/0367954 | A1 * | 12/2015 | Rebbeck ................ B64D 37/32 361/218 |
| 2016/0131179 | A1 | 5/2016 | Prouty et al. |
| 2017/0021209 | A1 | 1/2017 | Damazo et al. |

FOREIGN PATENT DOCUMENTS

| | | |
|---|---|---|
| DE | 1085586 B | 7/1960 |
| EP | 2713065 A2 | 4/2014 |
| EP | 2812248 A1 | 12/2014 |
| EP | 2860411 A1 | 4/2015 |
| EP | 2996941 A1 | 3/2016 |
| EP | 3027917 A1 | 6/2016 |
| EP | 3059170 A1 | 8/2016 |
| EP | 3106380 A1 | 12/2016 |
| EP | 3287362 A1 | 2/2018 |
| EP | 3462046 A1 | 4/2019 |
| JP | H03125911 U | 12/1991 |
| JP | 2001165138 A | 6/2001 |
| JP | 2002266832 A | 9/2002 |
| RU | 2014128760 A | 2/2016 |
| WO | WO-2009063063 A1 | 5/2009 |
| WO | WO-2012147645 A1 | 11/2012 |
| WO | WO-2012170672 A1 | 12/2012 |
| WO | WO-2013117756 A1 | 8/2013 |
| WO | WO-2013178985 A1 | 12/2013 |
| WO | WO-2014118117 A1 | 8/2014 |
| WO | WO-2014118510 A1 | 8/2014 |
| WO | WO-2014184722 A1 | 11/2014 |
| WO | WO-2015015153 A1 | 2/2015 |
| WO | WO-2015025130 A1 | 2/2015 |

OTHER PUBLICATIONS

Bart Stevens et al., U.S. Appl. No. 15/960,835, filed Apr. 24, 2018.
Sean Auffinger et al., U.S. Appl. No. 16/046,316, filed Jul. 26, 2018.
Novaria/ESNA Design, dated Jul. 14, 2017, 3 pgs.
Boeing Part Standard, BACC50AP, dated Feb. 2, 2017, 16 pgs.
Click Bond Cap dated May 16, 2016, 4 pgs.
European Search Report for EP Application No. EP19217717 dated May 8, 2020.
Drawings of Boeing Part Standard, BACC50AP, dated Feb. 2, 2017, 2 pgs.
Photographs of Boeing Proprietary, Zap Cap Further Screening Test Plan for 787 Fuel Tank Use, Mar. 24, 2016, 1 pg.
Toulouse, Mixed Metal-Composite Assembly, May 2013.
Boeing Proprietary, Zap Caps as Alternative to Seal Caps—Task No. 17728-01, dated Aug. 19, 2016, 30 pages.
Boeing Proprietary, Zap Cap Further Screening Test Plan for 787 Fuel Tank Use, Mar. 24, 2016, 24 pages.
Hutchinson Proprietary Document, Accessories: TP Nutcaps, 1 page.
http://www.ppgaerospace.com/getmedia/9a234ec3-1db9-48de-94f7-c212ac2ba705/SealCapFlyer.pdf.aspx, PPG Aerospace PRC Seal Caps, retrieved Sep. 7, 2016.
http://www.porex.com/files/documents/Porex-Battery-Vents-Letter---English, Porex Battery Vents, 2013.
Extended European Search Report for foreign counterpart EP Application No. 16173069, dated Nov. 17, 2016.
Product Literature for ERG Duocel Aluminum Foam, downloaded from ERO Aerospace website, www.ergaerospace.com/literature/erg_duocel.pdf, Jul. 9, 2015.
"HRL Researchers Develop World's Lightest Material," downloaded from HRL Laboratories website, www.hrl.com/hrlDocs/pressreleases/2011/prsRls_111117, Jul. 10, 2015.
Daniel J. Cowan et al., U.S. Appl. No. 15/964,340 filed Apr. 27, 2018.
Office Action for RU Application No. 2018127328/07 dated May 20, 2019.
EP Search Report for EP Application No. 19167831.7 dated Aug. 29, 2019.
EP Search Report for Application No. EP19166688 dated Aug. 29, 2019.
EP Office Action for Application No. 19166688.2 dated Sep. 20, 2019.
European Search Report for Application No. 19179944.4 dated Sep. 10, 2019.
Communication Pursuant to Article 94(3) dated Oct. 16, 2019.
Extended EP Search Report for EP Application No. 19207962.2 dated Mar. 26, 2020.
Extended EP Search Report for EP Application No. 19204019.4 dated Mar. 30, 2020.
Written Opinion for EP Application No. 19204019.4 dated Mar. 30, 2020.
Extended European Search Report for EP Application No. 20176033.7 dated Oct. 23, 2020.

* cited by examiner

EME PROTECTION CAP SYSTEM WITH PUSH SEALANT EXTRUSION MECHANISM

FIELD

This disclosure relates to an electrical insulation containment apparatus which electrically insulates a metallic fastener from transmitting electrical current or sparks into a vicinity of the metallic fastener upon an occurrence of an electromagnetic effect ("EME") or lightning strike event and more particularly to a cap assembly used in conjunction with a sealant.

BACKGROUND

In fabricating assemblies, such as an aircraft, cap assemblies are installed to enclose a metallic fastener that extends through a structure so as to protect the vicinity in which the metallic fastener is located within the aircraft from a transmission of any electrical current or spark from the metallic fastener. The cap assembly is used to insulate the metallic fastener from transmitting any current or electrical spark from the metallic fastener to the vicinity of the location of the metallic fastener within the aircraft upon an occurrence of an electromagnetic effect ("EME") or lightning strike event.

In installing cap assemblies for electrically isolating a metallic fastener, which extends from a structure, the cap assembly is filled with uncured sealant and the cap assembly is placed over the metallic fastener and onto a surface of the structure. The uncured sealant tends to expand once the cap assembly is installed and the expansion of the uncured sealant tends to lift off the cap assembly from the surface of the structure such that the cap assembly no longer secures an enclosure of the metallic fastener. Cap assemblies that have experienced lift off from the surface of the structure are reinstalled thereby increasing the cost of providing electrical isolation of the metallic fasteners which extend from structures within the aircraft. In addition, sealant which can be constructed from high density material can add additional weight to the aircraft with filling the internal volume of the cap assembly with sealant when the cap assembly is installed. The additional weight to the aircraft can result in an increase in cost of operation of the aircraft.

There is a need for cap assemblies to avoid unnecessary additional weight with filling the cap assemblies with uncured sealant and there is a need to design a cap assembly in which uncured sealant expansion will have minimal or no lift off effect to a cap assembly.

SUMMARY

An example includes a cap assembly for enclosing a metallic fastener which extends through a structure which includes a housing which includes an inner wall to position about the metallic fastener and having a first end for abutting the structure and an opposing second end positioned spaced apart from the first end. The housing further includes an outer wall which extends about and is spaced apart from the inner wall defining a space positioned between the inner wall and outer wall. The cap assembly further includes a plunger member which includes a side wall portion secured to an end wall portion, wherein the side wall portion of the plunger member has a thickness dimension smaller than a distance between the inner wall and the outer wall to position the sidewall portion of the plunger member within the space. With the side wall portion positioned within the space, the end wall portion is positioned in alignment with the opposing second end of the inner wall and with an opening defined by and through the inner wall.

An example includes a method for enclosing a metallic fastener extending through a structure, which includes a step of positioning a housing comprising an inner wall and outer wall onto the structure, wherein the inner wall surrounds the metallic fastener extending through the structure; and the outer wall extends about and is spaced apart from the inner wall defining a space between the inner wall and the outer wall which contains an uncured sealant. The method further includes the step of moving a side wall portion of a plunger member between the inner wall and the outer wall within the space displacing the uncured sealant within the space.

The features, functions, and advantages that have been discussed can be achieved independently in various embodiments or may be combined in yet other embodiments further details of which can be seen with reference to the following description and drawings.

DESCRIPTION

Figure 1:
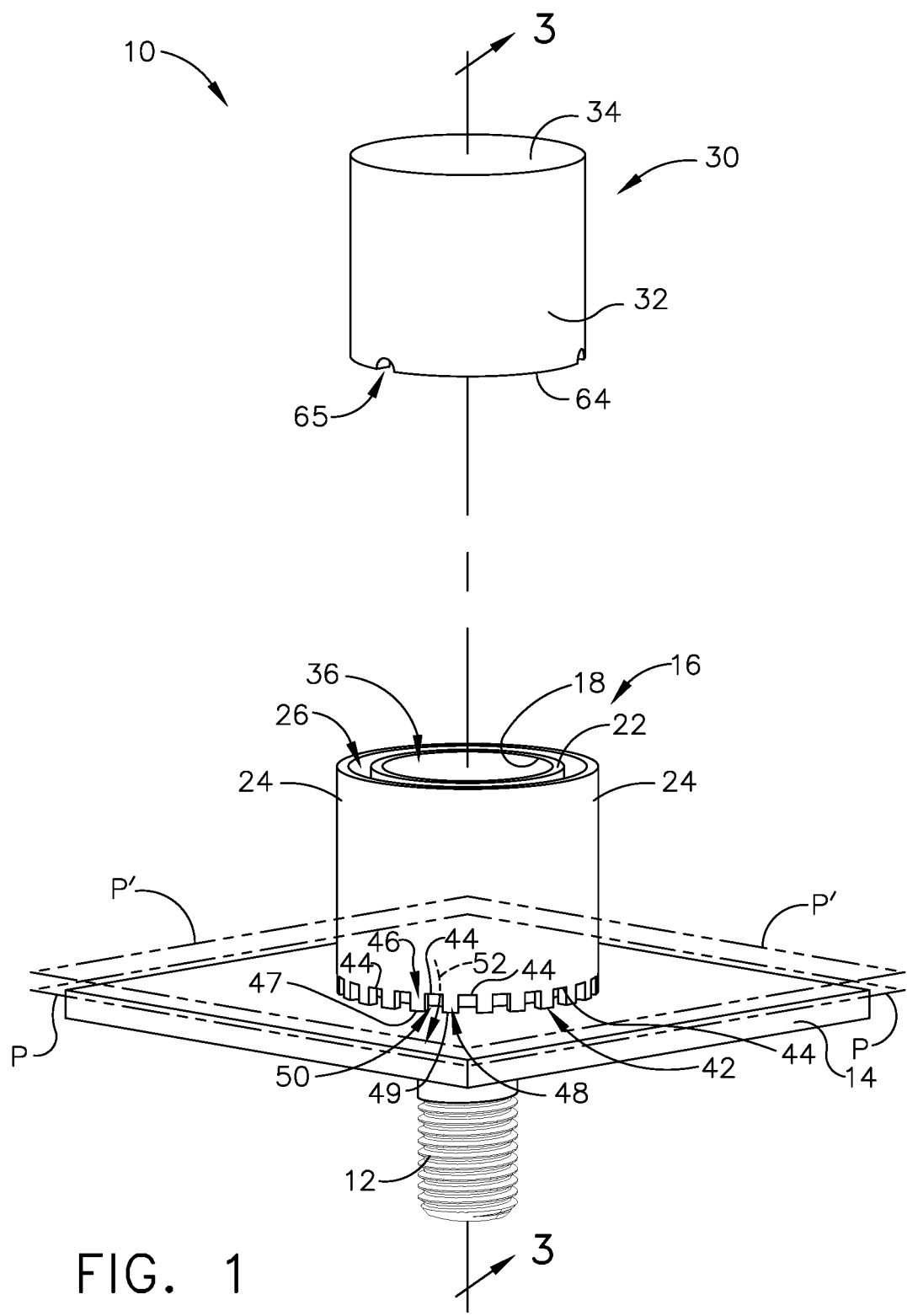
FIG. 1 is an exploded view of the cap assembly for enclosing a metallic fastener extending from a structure.

In referring to FIGS. 1-4, cap assembly 10 is shown for enclosing metallic fastener 12, which extends through structure 14. Housing 16 includes an inner wall 18 to position about metallic fastener 12 and having a first end 20 for abutting structure 14 and an opposing second end 22. The shape of inner wall 18 can take on one of any number of shapes. The example shown herein utilizes a circular shape. Metallic fastener 12, which is positioned within housing 16, can be any one of a number of metallic fasteners. In this example, bolt head 13 is positioned within housing 16 of cap assembly 10. Bolt head 13 can be accompanied by one or more washers as needed. In other examples of metallic fasteners positioned within housing 16 of cap assembly 10, a threaded shaft with a secured nut(s) can be positioned within housing 16 of cap assembly 10, as well as, with washers as needed. Cap assembly 10 can enclose many other types and configurations of metallic connectors, as needed, for securement of structure 14.

Figure 2:
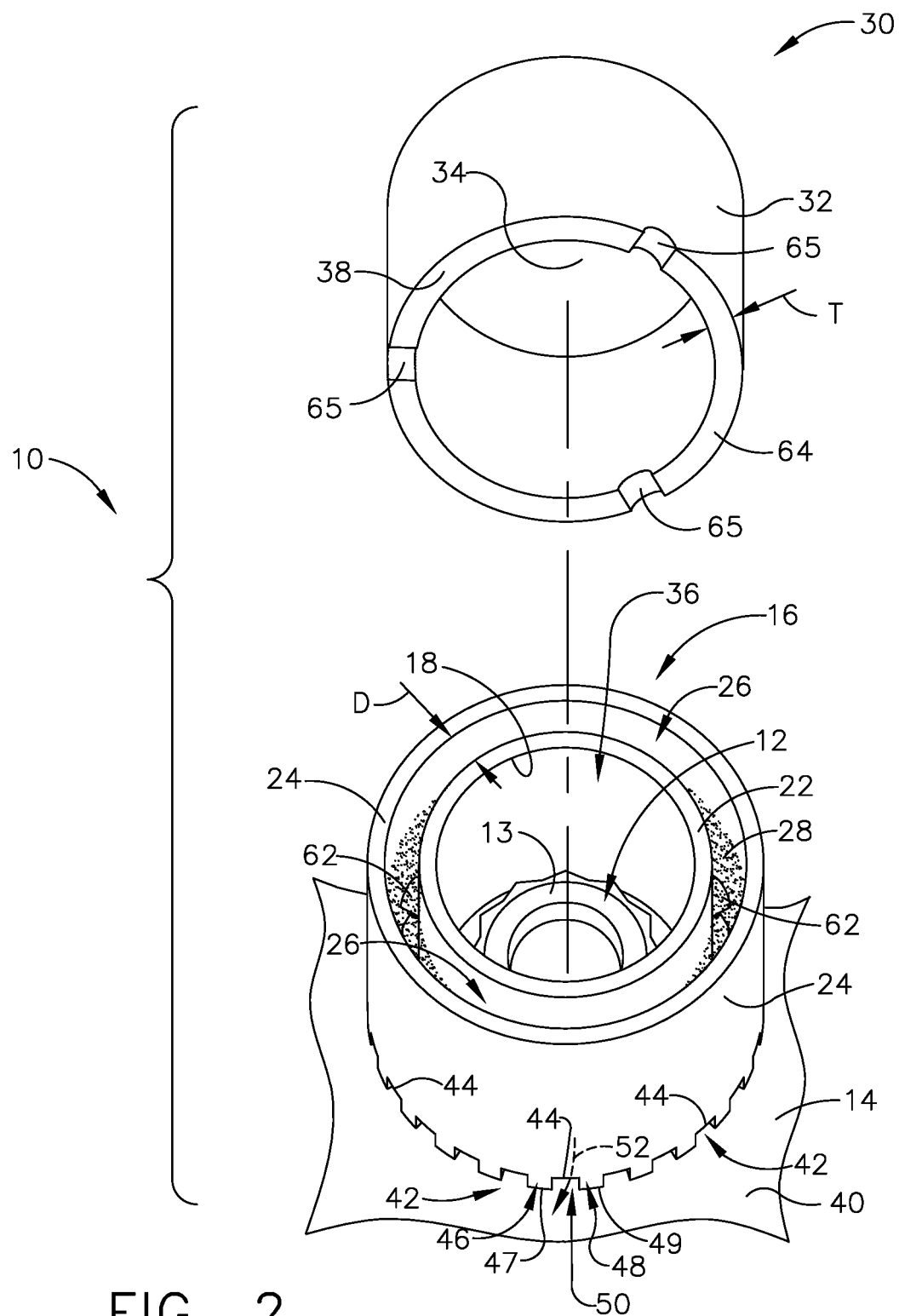
FIG. 2 is a perspective view of the exploded view of the cap assembly of FIG. 1.
Figure 3:
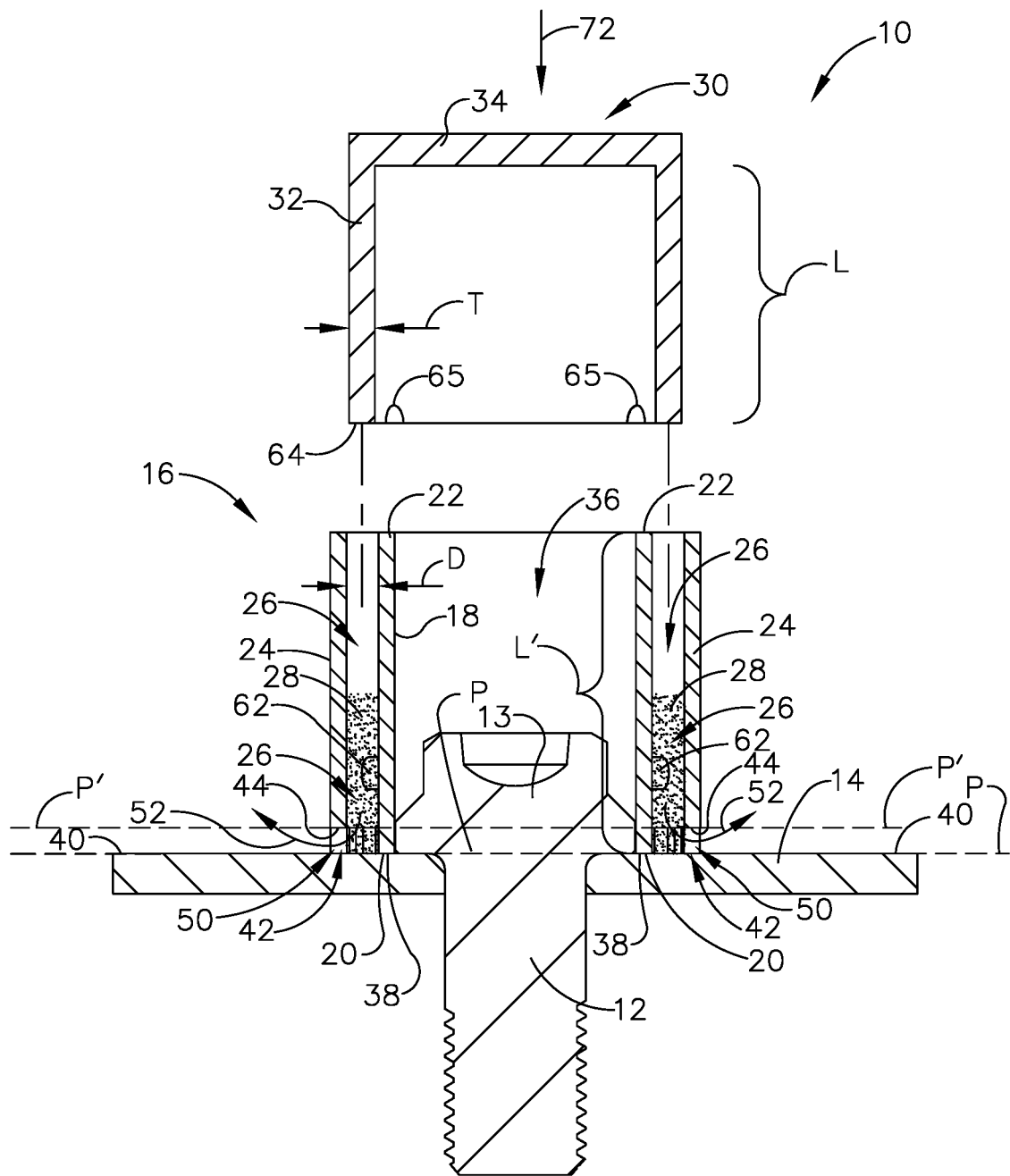
FIG. 3 is a cross section view along line 3-3 of the cap assembly of FIG. 1.
Figure 4:
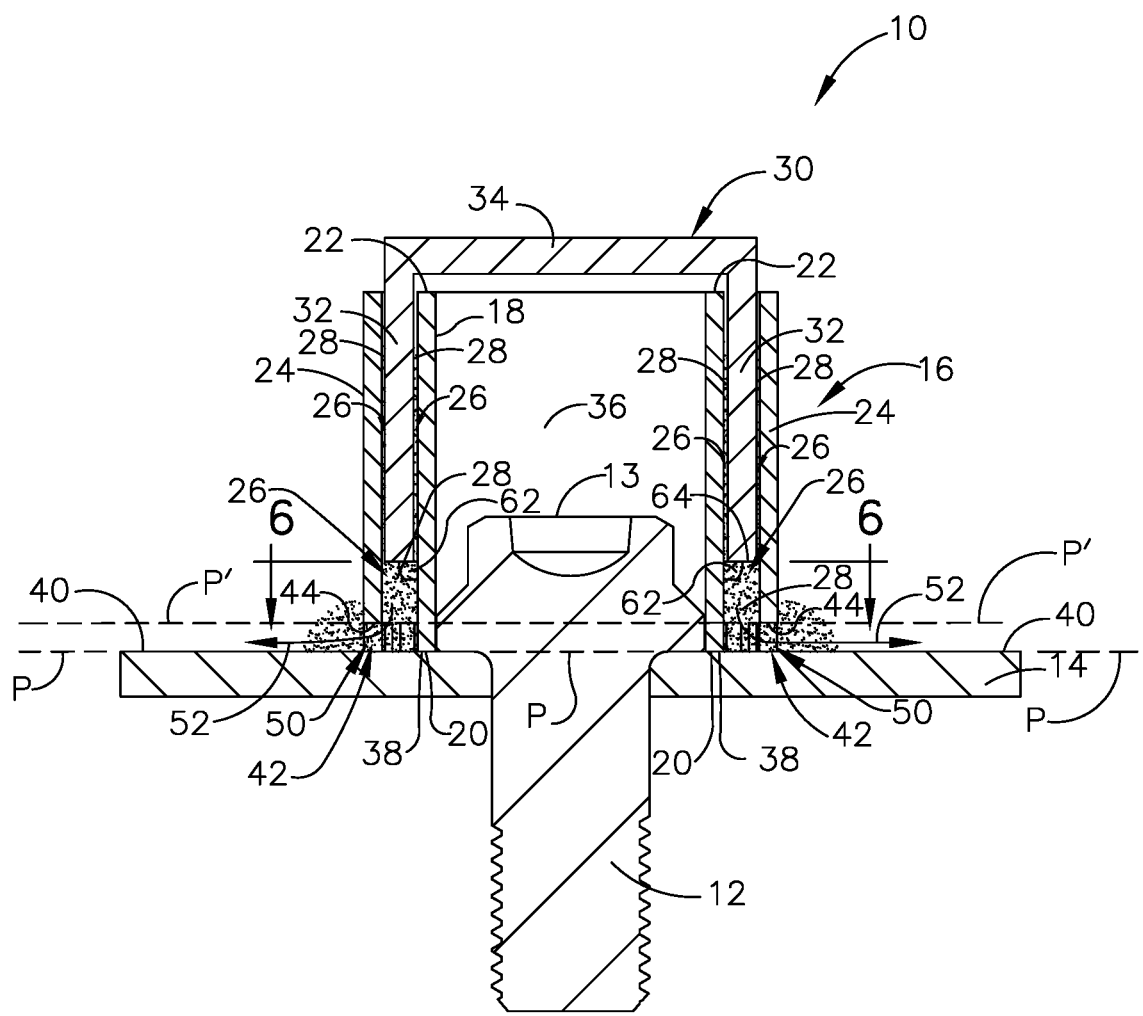
FIG. 4 is an assembled cross section view of the cap assembly of FIG. 3.
Figure 6:
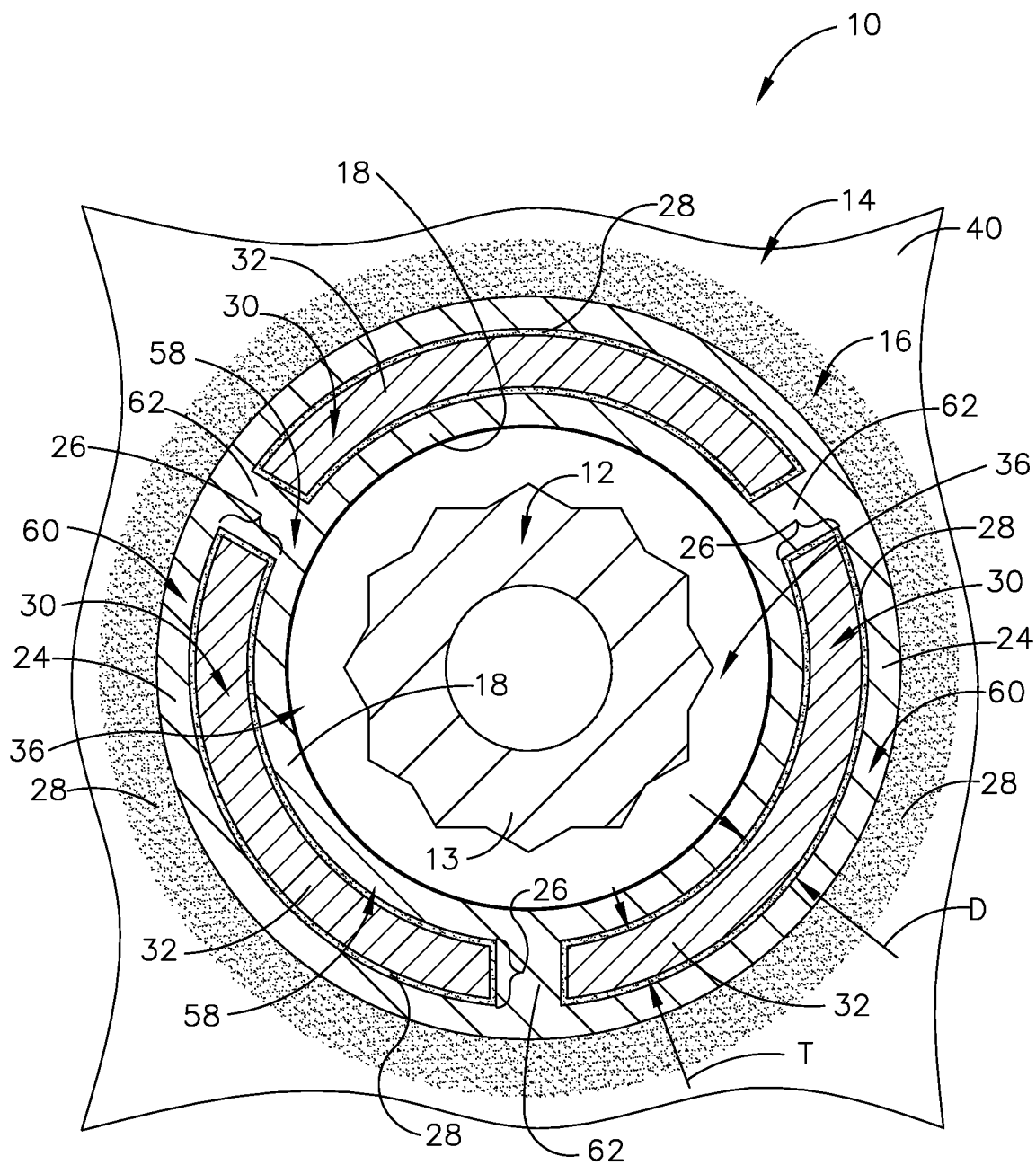
FIG. 6 is a cross section view along line 6-6 of the assembled cap assembly of FIG. 4.

Outer wall 24, which extends about and is spaced apart from inner wall 18, defines space 26 positioned between inner wall 18 and outer wall 24. The shape of outer wall 24 can take on one of any number of shapes. The example shown herein utilizes a circular shape. Space 26, as will be discussed, is utilized in this example to contain an uncured sealant or adhesive 28, as seen in FIGS. 2-4. Plunger member 30 includes side wall portion 32 secured to end wall portion 34. Side wall portion 32 of plunger member 30 has a thickness T dimension which is smaller than distance D dimension between inner wall 18 and outer wall 24, as seen in FIGS. 2, 3 and 6, which enables to position side wall portion 32 of plunger member 30 within space 26.

Positioning side wall portion 32 within space 26 can displace uncured sealant 28 which can be positioned within space 26, as will be further discussed. A controlled amount of uncured sealant 28 is positioned within space 26 such that with side wall portion 32 positioned within space 26 side wall portion 32 displaces uncured sealant 28. As will be discussed, uncured sealant 28 displaced from within space 26 provides for a controlled amount of squeeze out of uncured sealant 28 out of cap assembly 10.

Figure 5:
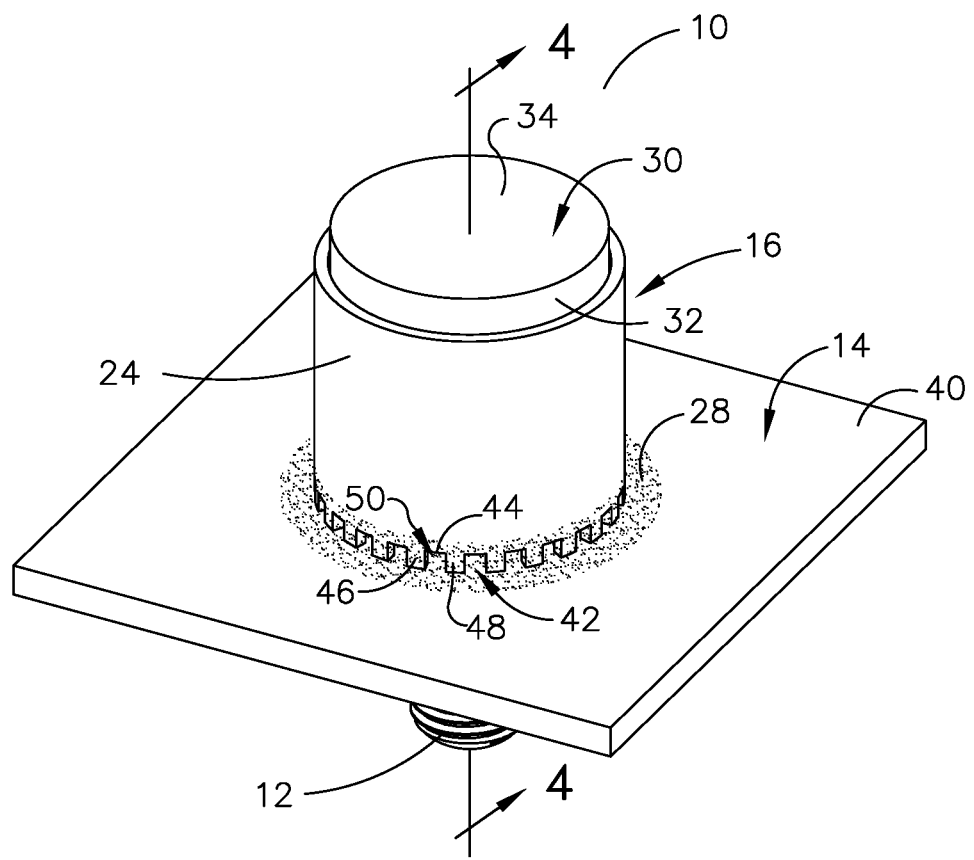
FIG. 5 is a perspective view of the cap assembly of FIG. 1.

With uncured sealant 28 contained within space 26 positioned between inner wall 18 and outer wall 24 and with side wall portion 32 of plunger member 30 positioned within space 26, uncured sealant 28 is positioned between at least one of inner wall 18 of housing 16 and side wall portion 32 of plunger member 30 or outer wall 24 of housing 16 and side wall portion 32 if plunger member 30. In this example, with side wall portion 32 positioned within space 26, uncured sealant 28 is positioned between side wall portion 32 of plunger member 30 and inner wall 18 and between side wall portion 32 and outer wall 24, space 26 is sealed closed. With sealing closed space 26, metallic fastener 12 is sealed within opening 36, which is defined by and which extends through inner wall 18. With using a controlled amount of uncured sealant 28, sealing closed space 26 is accomplished with minimizing or avoiding extruding uncured sealant 28 from space 26 into opening 36 and thereby avoiding positioning unnecessary additional weight of uncured sealant 28 within opening 36. In addition, with employment of side wall portion 32 within space 26, uncured sealant 28 positioned within space 26 is displaced within space 26 and will be positioned as squeeze out of cap assembly 10 as seen in FIG. 4. Uncured sealant 28 in contact with housing 16, side wall portion 32 and structure 14, when cured, secures cap assembly 10 to structure 14, as seen in FIG. 5. With side wall portion 32 positioned within space 26, end wall portion 34 is positioned in alignment with opposing second end 22 of inner wall 18 and with opening 36. This alignment provides an enclosure provided by housing 16 and plunger member 30 in which to contain metallic fastener 12.

In this example, housing 16 and plunger member 30 are constructed of a polymer material. The polymer material can be a material from one of many material compositions such as including a thermoplastic or thermoset polymers which provide electrical shielding with respect to the vicinity of metallic fastener 12 from metallic fastener 12. Plunger member 30 can also be constructed from one of phenolic, epoxy or other non-thermoplastic materials, as well as, polymers such as thermoplastics and thermosets which can also successfully shield the vicinity in which metallic fastener 12 is located from transmission of current or sparks from metallic fastener 12.

Uncured sealant contained within space 26 positioned between inner wall 18 and outer wall 24 can include one of a wide variety of materials such as polysulfides, silicones, urethanes, acrylics, epoxies, or other type of polymeric system that either cures or hardens in place to form a solid and adheres to an underlying structure. Uncured sealant 28 is deformable and moveable within cap assembly 10 with moving of side wall portion 32 within space 26 and within uncured sealant 28. Uncured sealant 28 is positioned within space 26 either at the time of installation by the installer or can be placed within space 26 by the vendor prior to delivery to the location of installation. In the latter occurrence, plunger member 30 can be positioned such that side wall portion 32 is positioned within space 26 at a location near an upper surface of the uncured sealant 28 positioned within space 26 or partially submerged within uncured sealant 28. In either occurrence, the installer at the time of installing will move plunger member 30 in a direction toward housing 16 and side wall portion 32 will penetrate or further penetrate uncured sealant 28 displacing the uncured sealant 28 within space 26.

In referring to FIGS. 3 and 4, plunger member 30 is positioned within housing 16. Side wall portion 32 of plunger member 30, as earlier mentioned, is positioned within space 26 and displaces uncured sealant 28 which is positioned within space 26. With side wall portion 32 penetrating or, if initially positioned partially submerged within uncured sealant 28, further penetrating uncured sealant 28, uncured sealant 28 is positioned between at least one of inner wall 18 of housing 16 and side wall portion 32 of plunger member 30 or outer wall 24 of housing 16 and side wall portion 32 of plunger member 30. In this example, as mentioned earlier, uncured sealant 28 is positioned between both side wall portion 32 and inner wall 18 and side wall portion 32 and outer wall 24, such that side wall portion 32 and uncured sealant 28 occupy space 26 sealing closed space 26.

With side wall portion 32 immersed within uncured sealant 28, any expansion of uncured sealant 28 that can create a lift off force does not lift inner wall 18. In this example, inner wall 18 has flat surface 38 abutting structure 14 with surface 40 having a flat configuration absent uncured sealant 28 being positioned between inner wall 18 and structure 14. Thus, any expansion of uncured sealant 28 does not place a lift force on inner wall 18. Any expansion of uncured sealant 28 confined within space 26 can be imparted to side wall portion 32 of plunger member 30 such that side wall portion 32 of plunger member 30 can move within space 26. With side wall portion 32 positioned sufficiently within space 26 side wall portion 32 remains within space 26 despite experiencing any lift off force and thereby maintains metallic fastener 12 contained within cap assembly 10 and maintains metallic fastener 12 sealed and isolated from outside of outer wall 24.

Figure 7:
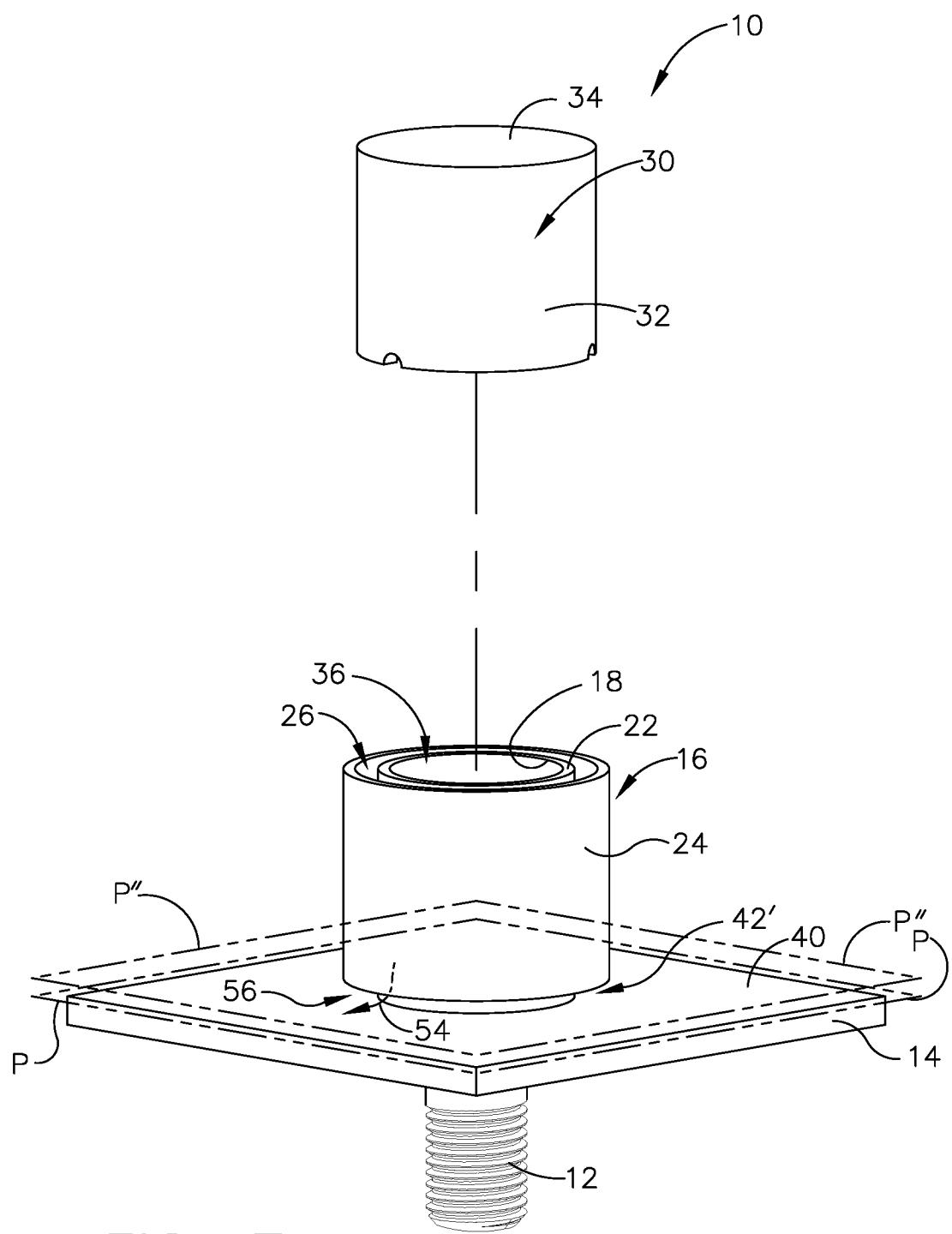
FIG. 7 is an exploded view of the cap assembly for enclosing a metallic fastener extending from a structure having a second example of the outer wall.
Figure 8:
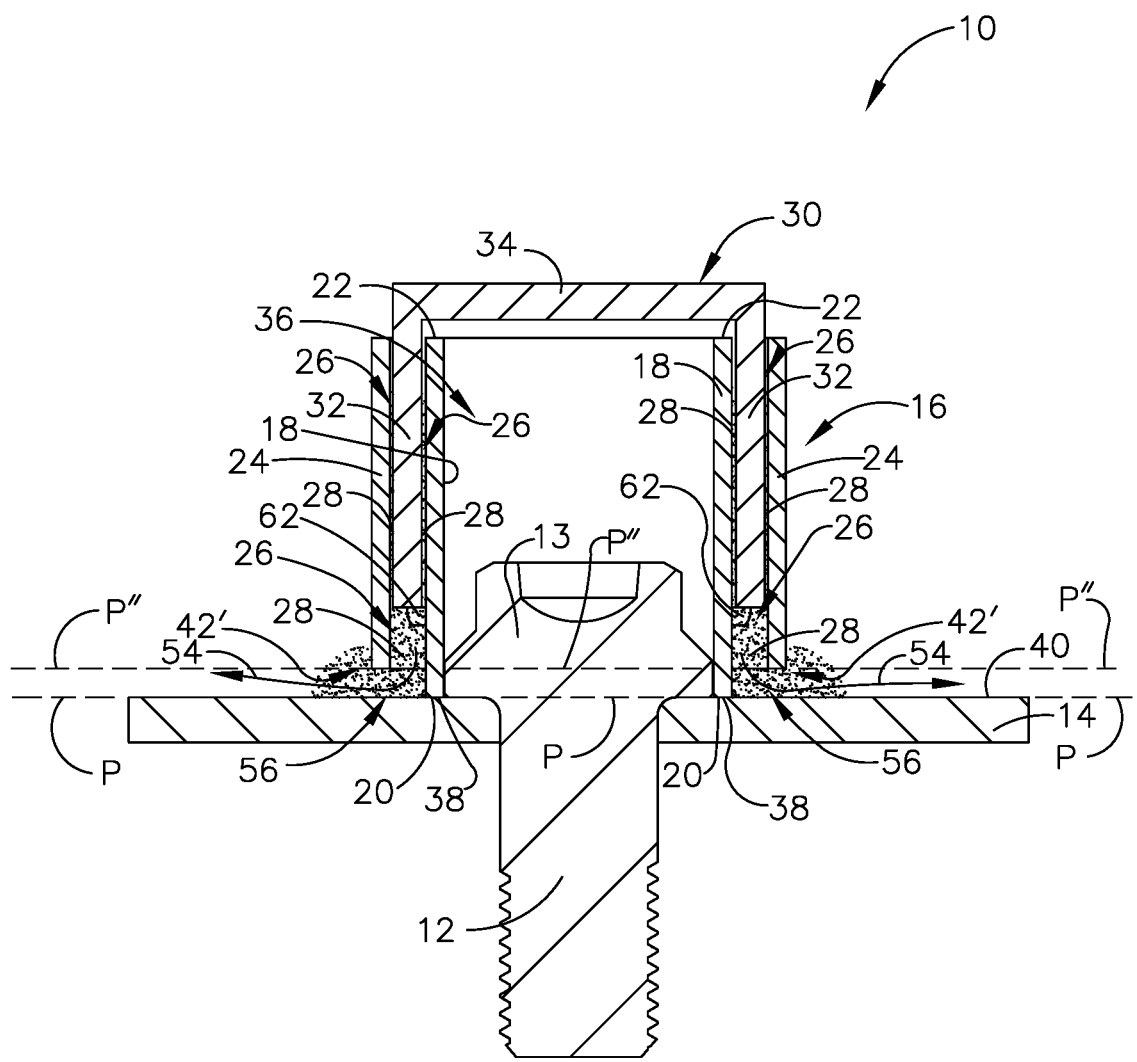
FIG. 8 is a cross section view of the cap assembly of FIG. 7 with the outer wall and the plunger member assembled enclosing the metallic fastener.

In referring to FIGS. 1-5, an example of configuration of first end 42 of outer wall 24 is shown and in FIGS. 7 and 8 a second example of configuration of first end 42' of outer wall 24 is shown. Both configurations, first end 42 and first end 42', as will be discussed, provide for a flow path to extend from space 26 through outer wall 24 to permit uncured sealant 28 to be extruded as squeeze out through outer wall 24 with movement of side wall portion 32 of plunger member 30 within space 26 which contains uncured sealant 28. In referring to FIGS. 1-5, outer wall 24 of housing extends about inner wall 18 wherein at least a portion 44 of first end 42 of outer wall 24 is spaced apart from first plane P, which is defined by first end 20, in this example. First end 20 includes flat surface 38 of inner wall 18 of housing 16, as seen in FIGS. 3 and 4. First end 42 of the outer wall 24 defines first tab 46 and second tab 48 spaced apart from one another about outer wall 24 as seen in FIGS. 1 and 2. First end portion 47 of the first tab 46 of first end 42 of the outer wall 24 and second end portion 49 of the second tab 48 of first end 42 of outer wall 24 are positioned coplanar with first plane P.

At least a portion 44 of first end 42 of outer wall 24, defines, in this example, second plane P' as seen in FIGS. 1, 3 and 4, spaced apart from first plane P. At least a portion 44 of first end 42 extends between first tab 46 and second tab 48 positioned spaced apart from first plane P wherein first tab 46, second tab 48 and the at least a portion 44 of the first end 42 define recess 50 within outer wall 24 which extends through outer wall 24 and is in communication with space 26. With first end 20 of the inner wall 18 abutting surface 40 of structure 14, first flow path 52 is defined from space 26 through recess 50 of outer wall 24. This configuration in defining recess 50 through outer wall 24 permits uncured sealant 28, when displaced by side wall portion 32, to flow along first flow path 52 from space 26 and through recess 50 and be positioned outside of and adjacent to cap assembly 10. With uncured sealant 28 positioned outside and adjacent to housing 16, the installer can then smooth out the uncured sealant 28, further sealing closed space 26 from outside of outer wall 24 and sealing metallic fastener 12 within cap assembly 10 and at the same time providing a secure bond of cap assembly 10 to structure 14.

As can be seen in this example, other portions 44 of first end 42 of outer wall 24 are positioned similarly spaced apart from first plane P and similarly spaced apart tabs such as first tab and second tab 46, 48 are positioned about outer wall 24 having ends such as first end portion 47 and second end portion 49, respectively, coplanar with first plane P defining recess 50. As a result a number of first flow paths 52 are defined from space 26 through various recesses 50 of outer wall 24. With first end 42 of outer wall 24 constructed with a plurality of recesses 50, a plurality of first flow paths 52 from space 26 through recesses 50 are provided. Uncured sealant 28, when displaced from space 26 with side wall portion 32 of plunger member 30, moves through first flow path 52 and outside of outer wall 24 as seen in FIGS. 4 and 5. With a controlled amount of uncured sealant 28 positioned in space 26, the amount of uncured sealant 28 can be controlled which flows out of or squeezes out of recesses 50. Uncured sealant 28 which extrudes from recesses 50 can be smoothed out as mentioned earlier.

In referring to FIGS. 7 and 8, first end 42' of the outer wall 24 extends about inner wall 18 spaced apart from first plane P, which is defined by first end 20 of inner wall 18. This can be seen in FIG. 7 wherein first end 42' defines third plane P''' spaced apart from first plane P. With first end 20 of inner wall 18 abutting surface 40 of structure 14, second flow path 54 is defined from space 26 through gap 56 defined by first end 42' of outer wall 24 and surface 40 of structure 14 for permitting flow of displaced uncured sealant 28 from space 26. With a controlled amount of uncured sealant 28 positioned in space 26, the amount of uncured sealant 28 is also controlled which flows out of gap 56. With side wall portion 32 of the plunger member 30 having displaced uncured sealant 28 within space 26, uncured sealant 28 is positioned between at least one of between inner wall 18 of the housing 16 and side wall portion 32 of plunger member 30 or outer wall 24 of housing 16 and side wall portion 32 of plunger member 30. In this example, as mentioned earlier, uncured sealant 28 is positioned between inner wall 18 and the side wall portion 32 and between outer wall 24 and side wall portion 32. As discussed earlier, uncured sealant 28 and side wall portion 32 occupy space 26 such that space 26 is sealed closed sealing off opening 36 and metallic fastener 12 from outside of outer wall 24 at structure 14. Uncured sealant 28 that extrudes through gap 56 can, as earlier discussed, be smoothed out about outer wall 24 further sealing closed access to space 26 from outside of outer wall 24. When uncured sealant 28 is cured, a strong bond is established between housing 16 and side wall portion 32 and between structure 14 with respect to housing 16 and sidewall portion 32, securing cap assembly 10 to structure 14.

In referring to FIG. 6, cross section of inner wall 18 includes circular configuration 58 and cross section of outer wall 24 includes circular configuration 60, which in this example, provides ease in handling, installing and optimizes cap assembly 10 enclosing various shapes of fasteners and minimize the amount of space occupied with respect to structure 14 and with respect with the vicinity of metallic fastener 12. Inner wall 18 and outer wall 24 of cap assembly 10 can take one of numerous configurations that will enclose metallic fastener 12 and accommodate confinements associated with structure 14. Connector member 62 secures inner wall 18 to outer wall 24. As seen in FIG. 6 connector member 62 extends across space 26 and are spaced apart from first end 20 of inner wall 18 as seen in FIGS. 3 and 4. At least two connector members 62, and in this example three, are positioned spaced apart from one another about inner wall 18 as seen in FIG. 6. Connector members 62 provides structural support strength for housing 16 and provides alignment of inner wall 18 with respect to outer wall 24. In addition, connector members 62 provide a stop for the travel of side wall portion 32 of plunger member 30 within space 26, as will be discussed below.

Side wall portion 32 of plunger member 30 has length L, as seen in FIG. 3, which is less than length L' of inner wall 18 of housing 16. With first end 64 of side wall portion 32 of plunger member 30 in contact with connector member 62, and in this example, in contact with three connector members 62, end wall portion 34 of the plunger member, as seen in FIG. 4, is positioned spaced apart from opposing second end 22 of inner wall 18 of housing 16. The spacing apart of end wall portion 34 from opposing second end 22 of inner wall 18 provides for an occurrence of any excess of uncured sealant 28 positioned in space 26 to flow into opening 36 and alleviate back pressure during movement of plunger member 30 toward housing 16 during installation. Similarly, the spacing apart of end wall portion 34 and opposing second end 22 will permit expansion of uncured sealant 28 to expand in the direction of spaced apart opposing second end 22 and end wall portion 34 and into opening 36 and reduces movement of plunger member 30 by way of the expansion of uncured sealant 28.

In this example, first end 64 of side wall portion 32 defines notches 65, as seen in FIGS. 2 and 3, which engage connector member(s) 62 with side wall portion 32 contacting connector members 62. Notches 65 provide a secure engagement of side wall portion 32 with connector members 62. Positioning of connector members 62 spaced apart from first end 20 of inner wall 18, as seen in FIG. 3, prevents side wall portion 32 of plunger member 30 from over traveling within space 26 and causing a reduction of uncured sealant 28 within space 26 used in securing cap assembly 10 to structure 14 and for maintaining space 26 sealed closed sealing opening 36, which contains metallic fastener 12, from outside of outer wall 24. Providing a controlled amount of uncured sealant 28 within space 26 results in controlled amount of uncured sealant 28 being positioned around cap assembly 10 and limits the amount of uncured sealant 28 to be positioned within cap assembly 10 between inner wall 18 and outer wall 24, as seen in FIG. 4. Using a controlled amount of uncured sealant 28 also avoids extruding uncured sealant 28 from space 26 into opening 36, which can unnecessarily add weight to installed cap assembly 10. With avoiding filling opening 36 with high density uncured sealant 28, cap assembly 10 provides a secure and electrically shielding apparatus without adding of unnecessary weight with filling opening 36 with uncured sealant 28.

Figure 9:
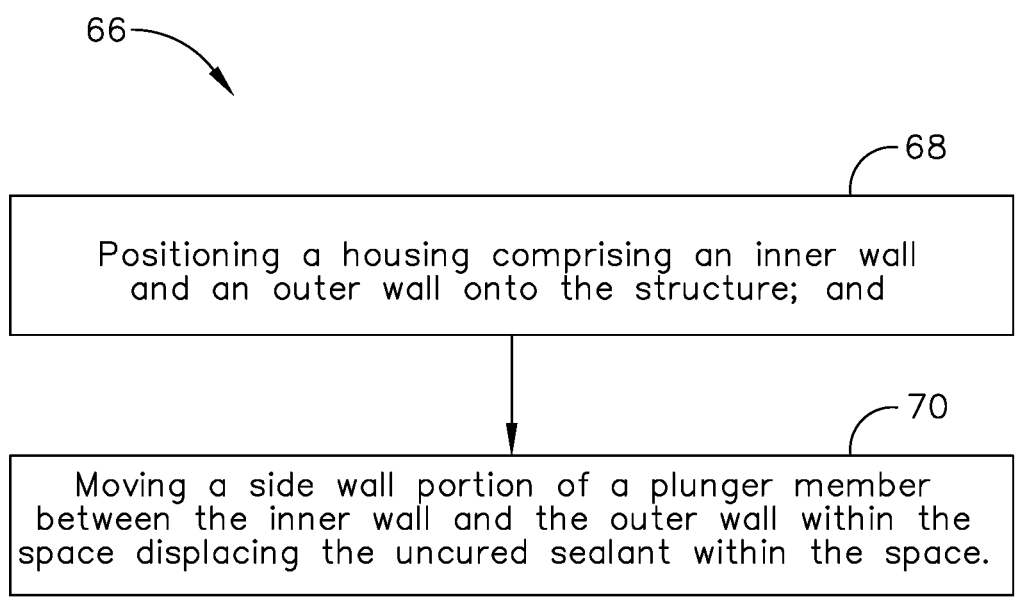
FIG. 9 is a flow chart of a method for enclosing a metallic fastener extending through a structure.

In referring to FIG. 9, method 66 for enclosing metallic fastener 12 which extends through structure 14 includes step 68 of positioning housing 16, which includes inner wall 18 and outer wall 24 onto structure 14. Inner wall 18 of housing 16 surrounds metallic fastener 12 extending through structure 14. Outer wall 24 extends about and is spaced apart from inner wall 18 defining space 26 between inner wall 18 and outer wall 24 which contains uncured sealant 28. Method 66 further includes step 70 of moving side wall portion 32 of plunger member 30 between inner wall 18 and outer wall 24 within space 26 displacing uncured sealant 28 within space 26. This method encloses metallic fastener 12 from surrounding vicinity of metallic fastener 12 and shields the vicinity from electrical transmission or sparks which can originate from metallic fastener 12. Uncured sealant 28 is positioned within space 26 without sealant being positioned throughout an internal volume of housing 16, thereby providing for the benefit of enclosing of metallic fastener 12 without providing additional weight with placing uncured sealant 28 throughout housing 16.

Step 70 of moving side wall portion 32 of plunger member 30 further includes moving the plunger member 30 in direction 72 toward housing 16 as seen in FIG. 3. Moving in the direction of housing 16 allows side wall portion 32 of plunger member 30 to move uncured sealant 28 in the direction toward structure 14 and outside outer wall 24. Moving side wall portion 32 of plunger member 30 within space 26 includes positioning uncured sealant 28 between at least one of side wall portion 32 of plunger member 30 and inner wall 18 of housing 16 or the side wall portion 32 of plunger member 30 and outer wall 24 of housing 16. As mentioned earlier, in this example, uncured sealant 28 is positioned between side wall portion 32 and plunger member 30 and between inner wall 18 and side wall portion 32, as seen in FIG. 4. Displacing uncured sealant 28 further includes in one example as seen in FIGS. 3 and 4 positioning uncured sealant 28 between at least a portion 44 of first end 42 of outer wall 24 and structure 14 and in another example as seen in FIGS. 7 and 8 positioning uncured sealant 28 between first end 42' of outer wall 24 and structure 14. Displacing uncured sealant 28 further includes extruding uncured sealant 28 from between first end 42 of outer wall 24 and structure 14 and away from outer wall 24 as seen in the first example in FIG. 4 and extruding uncured sealant 28 from between first end 42' of outer wall 24 and structure 14 and away from outer wall 24 as seen in the second example in FIG. 8. With extruding uncured sealant 28 outside of outer wall 24, the installer, as mentioned earlier, can smooth out the uncured sealant 28, further seal closed space 26 from outside of outer wall 24 and further secure housing 16 and plunger member 30 to structure 14.

While various embodiments have been described above, this disclosure is not intended to be limited thereto. Variations can be made to the disclosed embodiments that are still within the scope of the appended claims.

What is claimed:

1. A cap assembly for enclosing a metallic fastener which extends through a structure, comprising:
a housing comprising:
an inner wall to position about the metallic fastener and having a first end for abutting the structure and an opposing second end positioned spaced apart from the first end; and
an outer wall which extends about and is spaced apart from the inner wall defining a space positioned between the inner wall and outer wall, wherein with the first end of the inner wall in contact with the structure, a first end of the outer wall or a portion of the first end of the outer wall is positioned spaced apart from the structure; and
a plunger member comprising a side wall portion secured to an end wall portion, wherein:
the side wall portion of the plunger member has a thickness dimension smaller than a distance between the inner wall and the outer wall to position the side wall portion of the plunger member within the space; and
with the side wall portion positioned within the space, the end wall portion is positioned in alignment with the opposing second end of the inner wall and with an opening defined by and through the inner wall.

2. The cap assembly of claim 1, wherein the housing and the plunger member are constructed of a polymer material.

3. The cap assembly of claim 1, further includes an uncured sealant contained within the space positioned between the inner wall and the outer wall.

4. The cap assembly of claim 3, wherein, with the side wall portion of the plunger member positioned within the space, the side wall portion of the plunger member displaces the uncured sealant contained within the space and the uncured sealant is positioned between at least one of the inner wall of the housing and the side wall portion of the plunger member or the outer wall of the housing and the side wall portion of the plunger member.

5. The cap assembly of claim 1, wherein:
a cross section of the inner wall comprises a circular configuration; and
a cross section of the outer wall comprises a circular configuration.

6. The cap assembly of claim 1, further includes a connector member secured to the inner wall of the housing and secured to the outer wall of the housing with the connector member positioned spaced apart from the first end of the inner wall.

7. The cap assembly of claim 6, further includes at least two connector members positioned spaced apart from one another about the inner wall of the housing.

8. The cap assembly of claim 6, wherein the side wall portion of the plunger member has a length less than a length of the inner wall of the housing.

9. The cap assembly of claim 8, wherein with a first end of the side wall portion of the plunger member in contact with the connector member, the first end of the side wall portion of the plunger member is positioned spaced apart from the opposing second end of the inner wall of the housing.

10. The cap assembly of claim 1, wherein the first end of the inner wall of the housing comprises a flat surface.

11. The cap assembly of claim 1, wherein the portion of the first end of the outer wall is positioned spaced apart from a first plane defined by the first end of the inner wall of the housing.

12. A cap assembly for enclosing a metallic fastener which extends through a structure, comprising:
a housing comprising:

an inner wall to position about the metallic fastener and having a first end for abutting the structure and an opposing second end positioned spaced apart from the first end; and an outer wall which extends about and is space apart from the inner wall defining a space positioned between the inner wall and the outer wall; and a plunger member comprising a side wall portion secured to an end wall portion, wherein:

the side wall portion of the plunger member has a thickness dimension smaller than a distance between the inner wall and the outer wall to position the side wall portion of the plunger member within the space; and with the side wall portion positioned within the space, the end wall portion is positioned in alignment with the opposing second end of the inner wall and with an opening defined by and through the inner wall, wherein:

a portion of a first end of the outer wall is spaced apart from a first plane defined by the first end of the inner wall of the housing; and the first end of the outer wall defines a first tab and a second tab which are spaced apart from one another about the outer wall and a first end portion of the first tab and a second end portion of the second tab are positioned coplanar with the first plane.

13. The cap assembly of claim 12, wherein the portion of first end of the outer wall extends between the first tab and the second tab positioned spaced apart from the first plane wherein the first tab, the second tab and the portion of the first end of the outer wall define a recess within the outer wall which extends through the outer wall and is in communication with the space, such that, with the first end of the inner wall abutting the structure, a flow path is defined from the space through the recess of the outer wall.

14. The cap assembly of claim 1, wherein the first end of the outer wall extends about the inner wall spaced apart from a first plane defined by the first end of the inner wall.

15. The cap assembly of claim 14, wherein, with the first end of the inner wall abutting the structure, a flow path is defined from the space through a gap defined by the first end of the outer wall and the structure.

16. A method for enclosing a metallic fastener extending through a structure, comprising the steps of:

positioning a housing comprising an inner wall and outer wall onto the structure, such that a first end of the inner wall is placed into contact with the structure, wherein:

the inner wall surrounds the metallic fastener extending through the structure; and the outer wall extends about and is spaced apart from the inner wall defining a space between the inner wall and the outer wall which contains an uncured sealant and a first end of the outer wall or a portion of the first end of the outer wall is positioned spaced apart from the structure; and moving a side wall portion of a plunger member between the inner wall and the outer wall within the space displacing the uncured sealant within the space.

17. The method of claim 16, wherein moving the side wall portion of the plunger member further includes moving the plunger member in a direction toward the housing.

18. The method of claim 16, wherein moving the side wall portion of the plunger member within the space includes positioning the uncured sealant between at least one of the side wall portion of the plunger member and the inner wall of the housing or the side wall portion of the plunger member and the outer wall of the housing.

19. The method of claim 16 wherein displacing the uncured sealant further includes positioning the uncured sealant between the portion of a first end of the outer wall and the structure.

20. The method of claim 16, wherein displacing the uncured sealant further includes extruding the uncured sealant from between the first end of the outer wall and the structure and away from the outer wall.

* * * * *

UNITED STATES PATENT AND TRADEMARK OFFICE
CERTIFICATE OF CORRECTION

PATENT NO. : 10,989,244 B2
APPLICATION NO. : 16/196089
DATED : April 27, 2021
INVENTOR(S) : Sean Auffinger et al.

Page 1 of 1

It is certified that error appears in the above-identified patent and that said Letters Patent is hereby corrected as shown below:

In the Claims

At Column 9, Line 5, "space" should be -- spaced --.

Signed and Sealed this
Third Day of August, 2021

Drew Hirshfeld
*Performing the Functions and Duties of the
Under Secretary of Commerce for Intellectual Property and
Director of the United States Patent and Trademark Office*